US012646315B2

(12) United States Patent
Yee et al.

(10) Patent No.: US 12,646,315 B2
(45) Date of Patent: Jun. 2, 2026

(54) AQUATIC BIOMASS ESTIMATION

(71) Applicant: TidalX AI Inc, San Ramon, CA (US)

(72) Inventors: Yangli Hector Yee, San Francisco, CA (US); Terry Allan Smith, Saratoga, CA (US); Bianca Bahman, San Francisco, CA (US)

(73) Assignee: TidalX AI Inc., Mountain View, CA (US)

( * ) Notice: Subject to any disclaimer, the term of this patent is extended or adjusted under 35 U.S.C. 154(b) by 228 days.

(21) Appl. No.: 18/453,240

(22) Filed: Aug. 21, 2023

(65) Prior Publication Data

US 2024/0062539 A1 Feb. 22, 2024

Related U.S. Application Data

(60) Provisional application No. 63/399,501, filed on Aug. 19, 2022.

(51) Int. Cl.
*G06V 20/05* (2022.01)
*G06T 7/62* (2017.01)
*G06T 17/05* (2011.01)
*G06V 20/10* (2022.01)

(52) U.S. Cl.
CPC ................ *G06V 20/05* (2022.01); *G06T 7/62* (2017.01); *G06T 17/05* (2013.01); *G06V 20/188* (2022.01); *G06T 2207/10028* (2013.01)

(58) Field of Classification Search
CPC ...... G06V 20/05; G06V 20/188; G06V 10/26; G06T 7/62; G06T 17/05; G06T 2207/10028; G06T 2210/56; G06T 2210/61; G06T 17/00
See application file for complete search history.

(56) References Cited

U.S. PATENT DOCUMENTS 5,506,616 A * 4/1996 Scheps ............... G01N 21/8806
348/31
7,796,809 B1 * 9/2010 Carder ................. G06V 10/143
348/81
11,493,629 B1 * 11/2022 Shahrestani ............ G06F 21/64
(Continued)

OTHER PUBLICATIONS

Ventura et al., "High spatial resolution underwater data for mapping seagrass transplantation: A powerful tool for visualization and analysis", Elsevier, Dec. 22, 2021 (Year: 2021).*

*Primary Examiner* — Aaron W Carter
(74) *Attorney, Agent, or Firm* — Fish & Richardson P.C.

(57) ABSTRACT

Methods, systems, and apparatus, including computer programs encoded on computer storage media, for aquatic biomass estimation. One of the methods includes obtaining an image of an aquatic environment including aquatic grass; providing the image to a network model trained to construct a point cloud indicating a portion of the image that represents the aquatic grass; generating a floor model indicating a floor of the aquatic environment where the aquatic grass grows; identifying, using (i) the floor model and (ii) the point cloud indicating the aquatic grass, (i) a first subset of points in the point cloud as indicating aquatic grass and (ii) a second subset of points in the point cloud as indicating the floor of the aquatic environment; and generating, using the first subset of points in the point cloud, an indication of biomass within the aquatic environment.

20 Claims, 5 Drawing Sheets

(56) References Cited

U.S. PATENT DOCUMENTS

| | | | | |
|---|---|---|---|---|
| 11,520,042 | B1 * | 12/2022 | Douglass | G01C 13/00 |
| 2009/0105952 | A1 * | 4/2009 | Grace | G01C 21/005 |
| | | | | 701/300 |
| 2015/0206327 | A1 * | 7/2015 | Lauenstein | G06T 17/05 |
| | | | | 345/440 |
| 2016/0259054 | A1 * | 9/2016 | Proctor | G01S 7/56 |
| 2016/0341827 | A1 * | 11/2016 | Horner | G01S 15/8902 |
| 2018/0306916 | A1 * | 10/2018 | Kronander | G01S 15/89 |
| 2019/0094356 | A1 * | 3/2019 | Hunt | G01S 15/87 |
| 2019/0340440 | A1 * | 11/2019 | Atwater | G06T 7/20 |
| 2020/0180740 | A1 * | 6/2020 | Christ | B63B 23/26 |
| 2020/0379104 | A1 * | 12/2020 | Zimmerman | G01S 7/53 |
| 2021/0031891 | A1 * | 2/2021 | Englot | B63G 8/001 |
| 2021/0149543 | A1 * | 5/2021 | Nguyen | G06F 3/04815 |
| 2021/0209351 | A1 * | 7/2021 | Young | G06T 7/70 |
| 2022/0214689 | A1 * | 7/2022 | Pavlica | B63B 79/40 |
| 2023/0267731 | A1 * | 8/2023 | Shang | G01N 33/12 |
| | | | | 382/110 |
| 2024/0062539 | A1 * | 2/2024 | Yee | G06V 10/26 |
| 2024/0124111 | A1 * | 4/2024 | Swanson | B63G 8/001 |
| 2024/0221180 | A1 * | 7/2024 | Siak | G06V 10/25 |
| 2024/0355115 | A1 * | 10/2024 | Young | G06V 10/761 |
| 2024/0355116 | A1 * | 10/2024 | Young | G06V 20/05 |

* cited by examiner

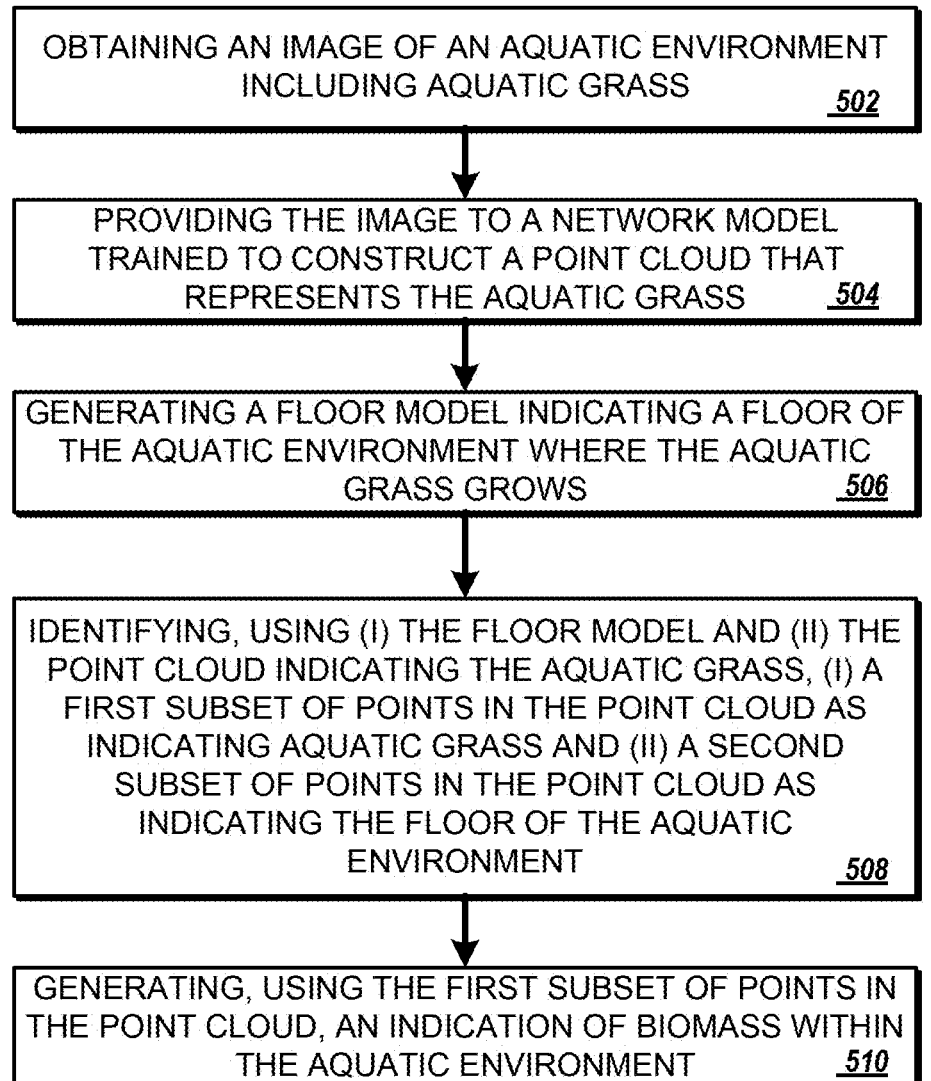

*500*

OBTAINING AN IMAGE OF AN AQUATIC ENVIRONMENT
INCLUDING AQUATIC GRASS                    <u>502</u>

PROVIDING THE IMAGE TO A NETWORK MODEL
TRAINED TO CONSTRUCT A POINT CLOUD THAT
REPRESENTS THE AQUATIC GRASS        <u>504</u>

GENERATING A FLOOR MODEL INDICATING A FLOOR OF
THE AQUATIC ENVIRONMENT WHERE THE AQUATIC
GRASS GROWS                    <u>506</u>

IDENTIFYING, USING (I) THE FLOOR MODEL AND (II) THE
POINT CLOUD INDICATING THE AQUATIC GRASS, (I) A
FIRST SUBSET OF POINTS IN THE POINT CLOUD AS
INDICATING AQUATIC GRASS AND (II) A SECOND
SUBSET OF POINTS IN THE POINT CLOUD AS
INDICATING THE FLOOR OF THE AQUATIC
ENVIRONMENT                    <u>508</u>

GENERATING, USING THE FIRST SUBSET OF POINTS IN
THE POINT CLOUD, AN INDICATION OF BIOMASS WITHIN
THE AQUATIC ENVIRONMENT            <u>510</u>

FIG. 5

AQUATIC BIOMASS ESTIMATION

CROSS-REFERENCE TO RELATED APPLICATION

This application claims the benefit of U.S. Provisional Application No. 63/399,501, filed Aug. 19, 2022, the contents of which are incorporated by reference herein.

FIELD

This specification generally relates to applications of machine learning, e.g., within an aquatic environment.

BACKGROUND

Oceans and other bodies of water are filled with biomass such as sea grass, animals, coral, among others. Because of the scale of these bodies, difficulties in data gathering, processing bandwidth, and model quality, estimation of biomass can be difficult.

SUMMARY

In some implementations, cameras or sonar are used by an electronic system to estimate biomass (e.g., seagrass). Estimated biomass of seagrass can be used to measure an amount of carbon sequestered by seagrass underwater. Although seagrass is discussed herein, other forms of biomass, including fish, coral, phytoplankton, zooplankton, among others, can be estimated using methods similar to those discussed.

Systems can estimate seagrass biomass using various sensors such as stereo cameras and sonar. In some implementations, seagrass biomass estimation enable future carbon credits. For example, systems can predict a current or projected biomass (e.g., of seagrass). The prediction can be used to sell future carbon sequestration credits based on an amount of carbon that is captured by the seagrass as biomass.

In general, one aspect of the subject matter described in this specification can be embodied in methods that include the actions of obtaining an image of an aquatic environment including aquatic grass; providing the image to a network model trained to construct a point cloud indicating a portion of the image that represents the aquatic grass; generating a floor model indicating a floor of the aquatic environment where the aquatic grass grows; identifying, using (i) the floor model and (ii) the point cloud indicating the aquatic grass, (i) a first subset of points in the point cloud as indicating aquatic grass and (ii) a second subset of points in the point cloud as indicating the floor of the aquatic environment; and generating, using the first subset of points in the point cloud, an indication of biomass within the aquatic environment.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations, actions include obtaining sensor data from the aquatic environment; and determining, using the sensor data, a physical dimension of the aquatic grass. In some implementations, obtaining the sensor data includes obtaining sonar data from one or more sonar enabled devices operating in the aquatic environment. In some implementations, obtaining the sensor data includes obtaining image data from one or more submersible cameras operating in the aquatic environment.

In some implementations, generating the floor model indicating the floor of the aquatic environment includes modeling regions of seabed with a geometric structure indicating one or more of a plane or interpolating spline.

In some implementations, the aquatic grass is seagrass located on a seabed. In some implementations, actions include generating a signal indicating the biomass within the aquatic environment; and providing the signal to a device, wherein the signal is configured to display an indication of the biomass within the aquatic environment.

In some implementations, generating the indication of the biomass within the aquatic environment includes: determining a density of the aquatic grass; determining, using the first subset of points in the point cloud, a volume of the aquatic grass; and wherein generating the indication of the biomass within the aquatic environment comprises using (i) the density of the aquatic grass and (ii) the first subset of points in the point cloud.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 5 is a flow diagram of an example process for aquatic biomass estimation.

Like reference numbers and designations in the various drawings indicate like elements.

DETAILED DESCRIPTION

Figure 1:
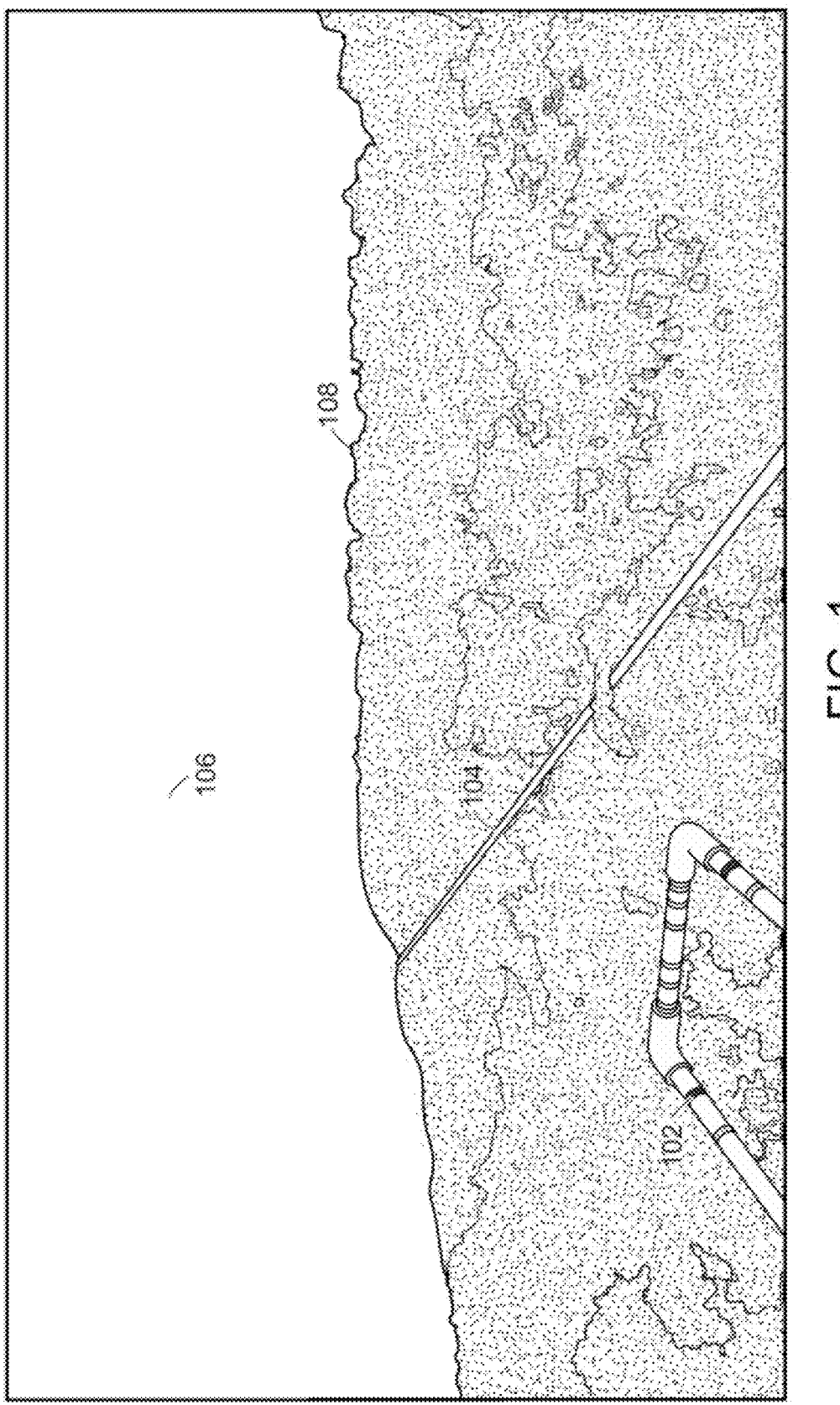
FIG. 1 is a diagram showing an example image used for aquatic biomass estimation.

FIG. 1 is a diagram showing an example image 100 used for aquatic biomass estimation. The image 100 includes a representation of a quadrat. A quadrat is a square marked off area in which seagrass biomass is or has been measured. Measuring can include methods such as sampling above and below ground biomass. Actual carbon content can be measured via physical means. The term target can refer to the ground truth amount of seagrass biomass in a quadrat. The term transect can refer to a line across a habitat for which measurements are taken.

In some implementations, a neural network (NN) (e.g., a convolutional neural network) obtains an image that includes a quadrat. The image can be cropped (e.g., by an implementing system, such as computing devices 400, 450). In some implementations, the NN is connected to a feedforward NN. The feedforward NN regression target can include an above and below ground biomass.

Implementations can include a NN connected to a feedforward NN. Without stereo cameras it can be hard to estimate scale. There may be too many variables predicting just one. In some implementations, the NN could use a quadrat size rather than actual seagrass.

In some implementations, spatial partitioning of points obtained using photogrammetry is used by an implementing system for aquatic biomass estimation. This approach is discussed, e.g., in regard to FIG. 2 and FIG. 3.

Figure 2:
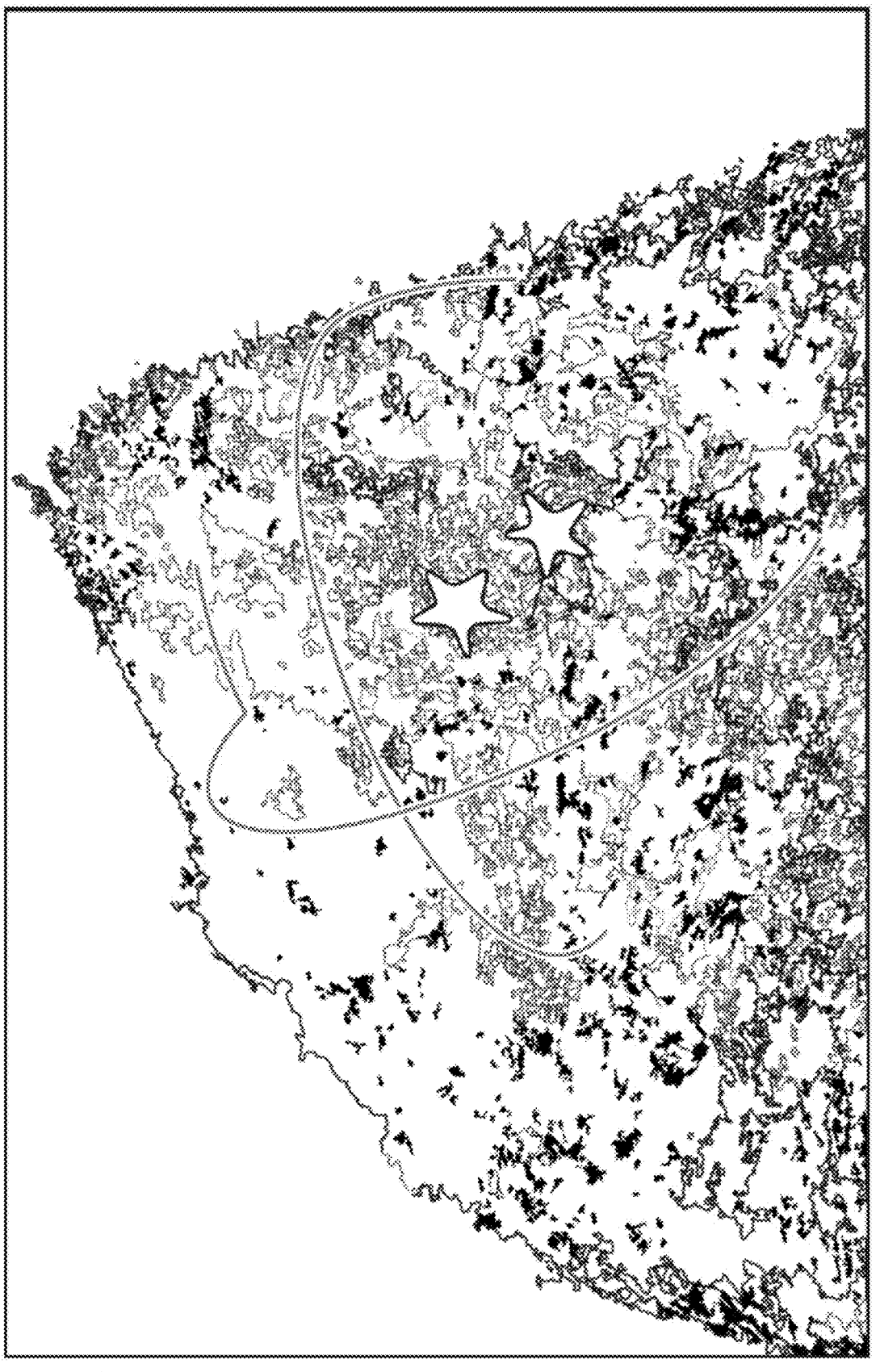
FIG. 2 is a diagram showing an example structure from motion reconstruction of a portion of an image from above.
Figure 3:
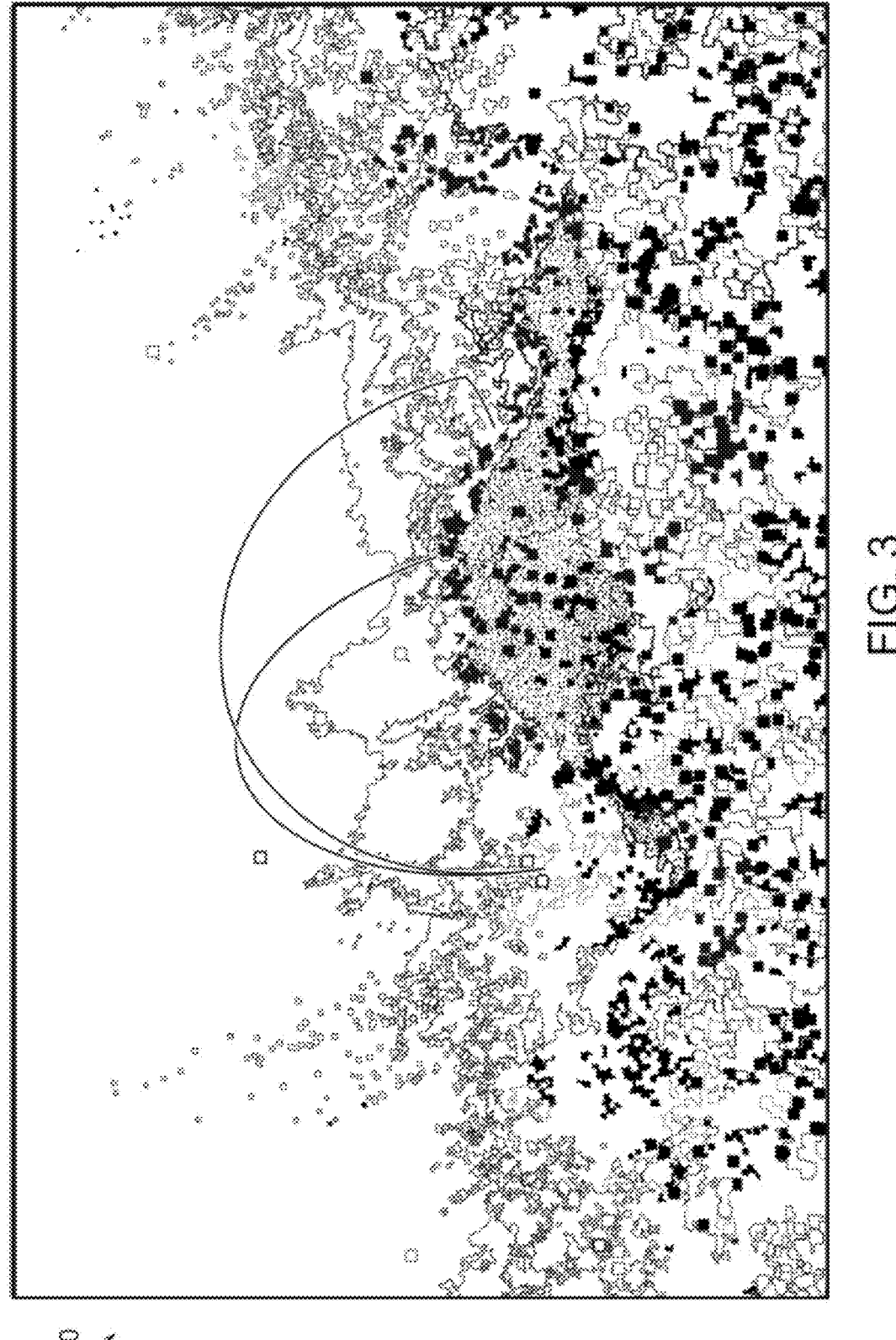
FIG. 3 is a diagram showing an example structure from motion reconstruction of a portion of an image from a seabed perspective.

FIG. 2 is a diagram showing an example structure from motion reconstruction of a portion of an image from above, e.g., from one or more image sensors affixed to a boat, submersible, or other device. FIG. 3 is a diagram showing an example structure from motion reconstruction of a portion of an image from a seabed perspective.

In some implementations, a variance in a height of points from the seabed is used to segment out potential seagrass points as seagrass moves and causes noise in photogrammetry that is larger than a noise from the seabed measurements.

In some implementations, implementing systems extract a point cloud of a region surrounding a quadrat. Implementing systems can obtain an image (e.g., the image 100) and process the image using photogrammetry. Systems can use structure from motion and stereo photogrammetry to extract a point cloud of the region surrounding the quadrat 102. Systems can model regions that are a seabed (e.g., region 108, included in perimeter of the quadrat 102) with a geometric structure that assumes smoothness, such as a plane or an interpolating spline such as a Bezier curve. Systems can identify any region that has a height variance that satisfies one or more thresholds (e.g., higher than usual or an average) as including seagrass. Seagrass typically moves over time and has more measurement noise than smooth seabed nearby.

Systems can use this distinguishing characteristic to segment out one or more portions of seagrass using a spatial partitioning data structure. An objective of the spatial partitioning data structure can include maximizing model likelihood (e.g., how well does this cloud of points fit a local plane and any points that do not fit well can then be segmented as seagrass).

In some implementations, systems use classification and semantic segmentation of seagrass with a computer vision method, such as supervised object detection. Systems can project bounding boxes for the classification and semantic segmentation of seagrass onto three dimensional points to select points that are likely to be seagrass. Systems can determine a volume of seagrass using one or more bounding boxes of points that are selected by an object detection algorithm. Since seagrass is mostly water, systems can determine the biomass of the grass as a constant factor of density multiplied by the volume enclosed multiplied by a coverage within the bounding volume. Coverage can include a fraction of the bounding volume that encloses the seagrass that actually includes seagrass. Systems can determine coverage by projecting the seagrass down onto a locally planar surface (e.g., a seabed) as computed by a plane/curve fitter in a first step and counting a ratio of locations marked as seagrass versus seabed.

In some implementations, an algorithm performed by systems described herein includes counting a ratio of green pixels versus a combination of non-green pixels and green pixels after projecting the seagrass down onto a seabed plane. This algorithm can be improved using semantic segmentation. Systems can multiply a fraction of seagrass versus non seagrass pixels in a bounding volume by the bounding volume and density to obtain an estimate of seagrass biomass. This approach can be applied to other aquatic biomass such as coral, fish, among others. Pixel color and logic for segmentation can be adjusted based on the biomass in question.

In some implementations, systems include multibeam or multispectral sonar. In an example process, systems can obtain a stereo image pair (e.g., from a stereo camera of the systems). Systems can detect a front of the seagrass. Systems can identify species or age of a given biomass (e.g., fish, coral, seagrass, among others). Systems can use a typical density of a known species in biomass calculations when a height of a meadow of seagrass is known.

In some implementations, sonar detects a seabed. For example, a seabed can have a higher peak in a reflected waveform. However, depending on the frequency of wave used, seagrass itself might return a weaker ping. A difference in time between a weaker ping and a stronger one could give a depth (thickness) estimate of a seagrass. Stereo can return a distance to a front of seagrass. A probabilistic volume model can then be constructed (e.g., by implemented systems) to fuse together different measurements in order to return a maximum likelihood estimate of a volume of seagrass.

In some implementations, implementing systems use multi-frequency sonar for biomass estimation. For example, with multi-frequency sonar, higher frequency waveforms typically reflect differently than lower frequency waveforms and a difference can be used (e.g., by an implementing system) to measure a volume of seagrass. Lower frequency returns can have more bathymetric (seabed) depth data while higher frequency returns can give a height of the seagrass.

In general, mass is related to volume, e.g., mass can represent density multiplied by volume. In addition, volume can be represented as height multiplied by area. In some implementations, sea grass density is used as a constant by implementing systems. For example, systems can obtain data indicating a height and area and generate such a height and area using techniques described in this document. Systems can generate a volume using the height and area. Systems can generate a biomass estimate by multiplying the generated volume by a representation of biomass density—e.g., multiplied by a constant density representative of the density of sea grass.

In some implementations, structure from motion is used to recover sea grass density. For example, systems can generate one or more point clouds. Using the point clouds, systems can compute a bounding volume. Systems can estimate a fraction of such a volume that represents sea grass—e.g., by counting occupied voxels in the bounding volume as opposed to unoccupied. In some implementations, systems use an estimate of the density of the seagrass, e.g., derived from one or more machine learning model predictions, multiplied by a seagrass height generated from sensor data—e.g., sonar readings—to generate an estimate of the biomass. In some implementations, machine learning models used to predict sea grass density are trained using one or more items of ground truth data indicating known sea grass densities in a given area.

With quadrat locations being physically measured for carbon, systems can generalize to non-quadrat locations based on volume estimates from the structure from motion with the vision models providing confirmation that the region of seabed is covered by seagrass. Furthermore, maps of underwater regions can be made using autonomous underwater vehicles (AUVs) and thus systems can compute a total volume of seagrass biomass in an area.

Figure 4:
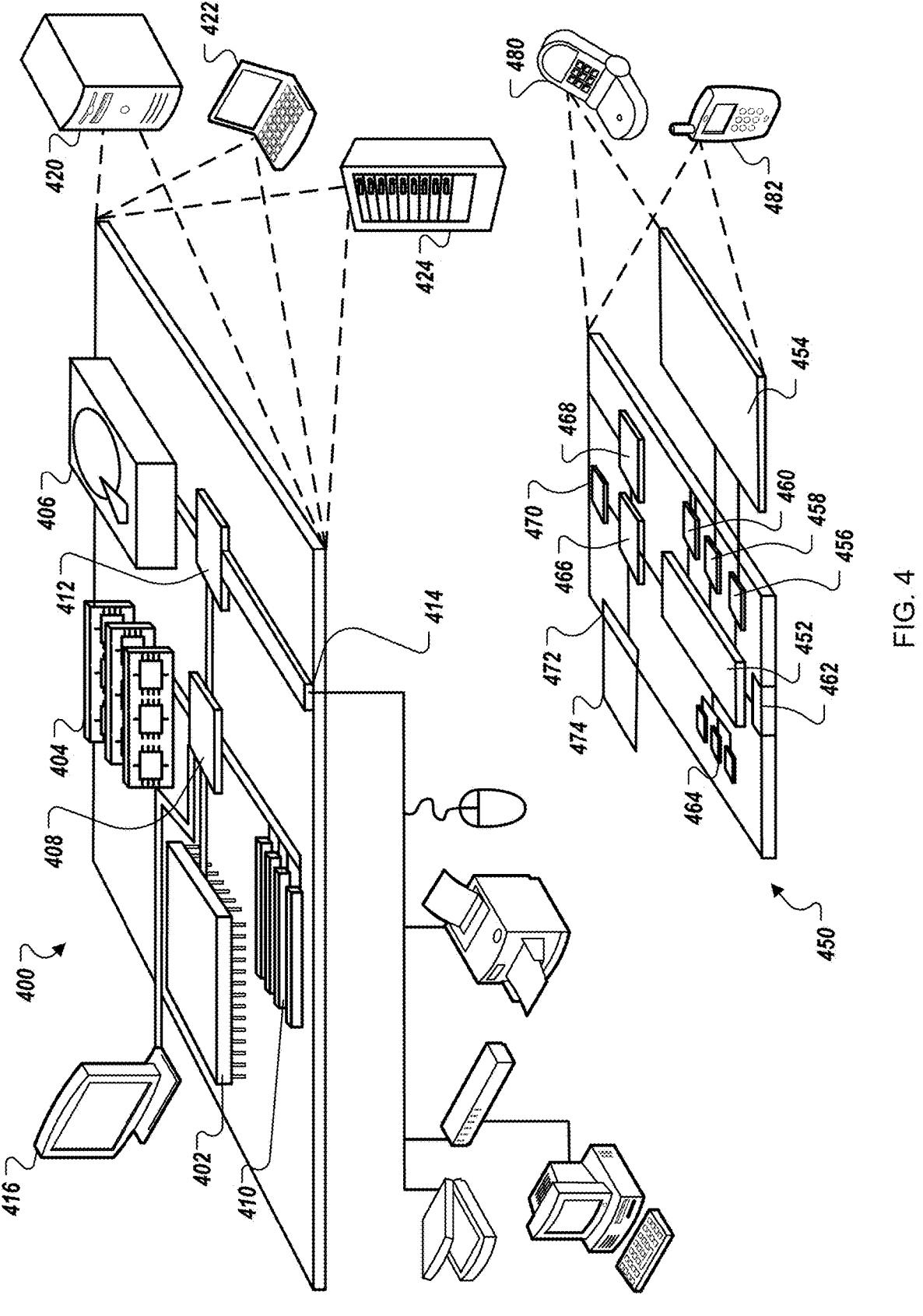
FIG. 4 is a block diagram of computing devices for aquatic biomass estimation.

FIG. 4 is a block diagram of computing devices 400, 450 that may be used in systems implementing the methods described in this specification, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this specification.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

FIG. 5 is a flow diagram of an example process 500 for aquatic biomass estimation. For example, the process 500 can be used by the one or more computer systems shown in FIG. 4 operating in an aquatic environment or communicably connected to sensors that captured sensor data from an aquatic environment. In general, techniques described in this document can include identifying biomass, such as sea grass, and identifying ocean bottom or other floor of an aquatic environment. Techniques can include creating or accessing a model trained to construct a model of either or both of the biomass and the floor. Techniques can include generating an estimate of biomass using a model of biomass and floor. Biomass estimation can be used for meadow mapping, tracking a health of a meadow over time, estimating a potential for carbon capture, or estimating a population of wildlife that can rely on biomass, such as sea grass, for habitat. Additional details for steps of the following example process can be found within this specification.

The process 500 includes obtaining an image of an aquatic environment including aquatic grass (502). For example, an implementing system, including one or more computers, can obtain an image, or other sensor data, of an aquatic environment. Data can include visual images, sonar data, LIDAR data, among other types of data. Sensors can include submersible devices that are communicably connected to one or more computers configured to perform steps of the process 500.

The process 500 includes providing the image to a network model trained to construct a point cloud that represents the aquatic grass (504). For example, an implementing system can obtain an image and provide the image to a model. The model can be trained using one or more images of aquatic grass with corresponding labels indicating features of the grass.

The process 500 includes generating a floor model indicating a floor of the aquatic environment where the aquatic grass grows (506). For example, an implementing system can generate, or access a pre-existing, model configured to generate an indication of a sea floor or other floor in an aquatic environment, as described in this document.

The process 500 includes identifying, using (i) the floor model and (ii) the point cloud indicating the aquatic grass, (i) a first subset of points in the point cloud as indicating aquatic grass and (ii) a second subset of points in the point cloud as indicating the floor of the aquatic environment (508). For example, one or more models can be used to estimate a shape of a seabed. One or more models can be used to estimate biomass. Using both these sets of models, implementing systems can determine an estimate of biomass as including biomass of the biomass estimate but not including volume estimated to be a part of the sea bed, or other aquatic floor.

The process 500 includes generating, using the first subset of points in the point cloud, an indication of biomass within the aquatic environment (510). For example, implementing systems can use structure from motion and stereo photogrammetry to extract a point cloud of the region surrounding the quadrat 102, as shown in the figures, such as FIG. 1.

In some implementations, the process 500 includes determining a density of the aquatic grass. For example, a density can be a dynamic density. The density might vary widely. In some implementations, density is measured directly by an optical method, such as that described in the process 500. In some implementations, density is measure using one or more machine learning models. For example, density can be an output of an artificial intelligence component or computer vision algorithm that predicts a density of seagrasses based on trained data.

In some implementations, the process 500 includes obtaining sensor data from an aquatic environment. For example, systems implementing the process 500 can obtain sensor data and determining, using the sensor data, a physical dimension of the aquatic grass. Implementing systems can use one or more other sensors to determine a height, e.g., not just optical analysis. If seagrass is above a threshold of density—e.g., determined by an implementing system based on obtained sensor data—other sensors might be more appropriate. For example, implementing systems can generate a signal to obtain sensor data of a different type if detecting that a region includes biomass that satisfies a threshold density.

The order of operations in the process 500 described above is illustrative only, and can be performed in different orders. In some implementations, the process 500 can include additional operations, fewer operations, or some of the operations can be divided into multiple operations.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be inter-connected by any form or medium of digital data commu-nication, e.g., a communication network. Examples of com-munication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descrip-tions of features specific to particular embodiments of the invention. Certain features that are described in this speci-fication in the context of separate embodiments can also be implemented in combination in a single embodiment. Con-versely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain cir-cumstances, multitasking and parallel processing may be advantageous. Moreover, the separation of various system components in the embodiments described above should not be understood as requiring such separation in all embodi-ments, and it should be understood that the described program components and systems can generally be inte-grated together in a single software product or packaged into multiple software products.

The invention claimed is:

1. A method comprising:
obtaining an image of an aquatic environment;
providing the image to a network model trained to con-struct a point cloud indicating a portion of the image that includes aquatic grass and a floor of the aquatic environment where the aquatic grass grows;
generating a floor model indicating the floor of the aquatic environment where the aquatic grass grows;
identifying, using (i) the floor model and (ii) the point cloud indicating the portion of the image that includes the aquatic grass and the floor of the aquatic environ-ment where the aquatic grass grows, a first subset of points in the point cloud as indicating aquatic grass and a second subset of points in the point cloud as indicat-ing the floor of the aquatic environment; and
generating, using the first subset of points in the point cloud, an indication of biomass within the aquatic environment.

2. The method of claim 1, comprising:
obtaining sensor data from the aquatic environment; and
determining, using the sensor data, a physical dimension of the aquatic grass.

3. The method of claim 2, wherein obtaining the sensor data comprises:
obtaining sonar data from one or more sonar enabled devices operating in the aquatic environment.

4. The method of claim 2, wherein obtaining the sensor data comprises:
obtaining image data from one or more submersible cameras operating in the aquatic environment.

5. The method of claim 1, wherein generating the floor model indicating the floor of the aquatic environment com-prises:
modeling regions of seabed with a geometric structure indicating one or more of a plane or interpolating spline.

6. The method of claim 1, wherein the aquatic grass is seagrass located on a seabed.

7. The method of claim 1, comprising:
generating a signal indicating the biomass within the aquatic environment; and
providing the signal to a device, wherein the signal is configured to display an indication of the biomass within the aquatic environment.

8. The method of claim 1, wherein generating the indi-cation of the biomass within the aquatic environment com-prises:
determining a density of the aquatic grass;
determining, using the first subset of points in the point cloud, a volume of the aquatic grass; and
wherein generating the indication of the biomass within the aquatic environment comprises using (i) the density of the aquatic grass and (ii) the first subset of points in the point cloud.

9. A system comprising one or more computers and one or more storage devices on which are stored instructions that are operable, when executed by the one or more computers, to cause the one or more computers to perform operations comprising:
obtaining an image of an aquatic environment;
providing the image to a network model trained to con-struct a point cloud indicating a portion of the image that includes aquatic grass and a floor of the aquatic environment where the aquatic grass grows;
generating a floor model indicating the floor of the aquatic environment where the aquatic grass grows;
identifying, using (i) the floor model and (ii) the point cloud indicating the portion of the image that includes the aquatic grass and the floor of the aquatic environ-ment where the aquatic grass grows, a first subset of points in the point cloud as indicating aquatic grass and a second subset of points in the point cloud as indicat-ing the floor of the aquatic environment; and
generating, using the first subset of points in the point cloud, an indication of biomass within the aquatic environment.

10. The system of claim 9, wherein the operations com-prise:
obtaining sensor data from the aquatic environment; and
determining, using the sensor data, a physical dimension of the aquatic grass.

11. The system of claim 10, wherein obtaining the sensor data comprises:
obtaining sonar data from one or more sonar enabled devices operating in the aquatic environment.

12. The system of claim 10, wherein obtaining the sensor data comprises:

obtaining image data from one or more submersible cameras operating in the aquatic environment.

13. The system of claim 9, wherein generating the floor model indicating the floor of the aquatic environment comprises:

modeling regions of seabed with a geometric structure indicating one or more of a plane or interpolating spline.

14. The system of claim 9, wherein the aquatic grass is seagrass located on a seabed.

15. The system of claim 9, wherein the operations comprise:

generating a signal indicating the biomass within the aquatic environment; and providing the signal to a device, wherein the signal is configured to display an indication of the biomass within the aquatic environment.

16. The system of claim 9, wherein generating the indication of the biomass within the aquatic environment comprises:

determining a density of the aquatic grass;

determining, using the first subset of points in the point cloud, a volume of the aquatic grass; and wherein generating the indication of the biomass within the aquatic environment comprises using (i) the density of the aquatic grass and (ii) the first subset of points in the point cloud.

17. One or more non-transitory computer storage media encoded with instructions that, when executed by one or more computers, cause the one or more computers to perform operations comprising:

obtaining an image of an aquatic environment;

providing the image to a network model trained to construct a point cloud indicating a portion of the image that includes aquatic grass and a floor of the aquatic environment where the aquatic grass grows;

generating a floor model indicating the floor of the aquatic environment where the aquatic grass grows;

identifying, using (i) the floor model and (ii) the point cloud indicating the portion of the image that includes the aquatic grass and the floor of the aquatic environment where the aquatic grass grows, a first subset of points in the point cloud as indicating aquatic grass and a second subset of points in the point cloud as indicating the floor of the aquatic environment; and generating, using the first subset of points in the point cloud, an indication of biomass within the aquatic environment.

18. The media of claim 17, wherein the operations comprise:

obtaining sensor data from the aquatic environment; and determining, using the sensor data, a physical dimension of the aquatic grass.

19. The media of claim 18, wherein obtaining the sensor data comprises:

obtaining sonar data from one or more sonar enabled devices operating in the aquatic environment.

20. The media of claim 18, wherein obtaining the sensor data comprises:

obtaining image data from one or more submersible cameras operating in the aquatic environment.

* * * * *